INVENTOR.
FLOYD C. SCOTT

Dec. 26, 1967 F. C. SCOTT 3,360,067
FOUR WHEEL DRIVE ARTICULATED VEHICLE
Original Filed Aug. 23, 1963 6 Sheets-Sheet 3

FIG. 4.

INVENTOR.
FLOYD C. SCOTT
BY
Van Valkenburgh and Fields
ATTORNEYS

FIG. 5.

INVENTOR.
FLOYD C. SCOTT
BY
Van Valkenburgh and Fields
ATTORNEYS

Dec. 26, 1967   F. C. SCOTT   3,360,067
FOUR WHEEL DRIVE ARTICULATED VEHICLE
Original Filed Aug. 23, 1963   6 Sheets-Sheet 5

FIG. 6.

INVENTOR.
FLOYD C. SCOTT
BY
Van Valkenburgh and Fields
ATTORNEYS

Dec. 26, 1967 F. C. SCOTT 3,360,067
FOUR WHEEL DRIVE ARTICULATED VEHICLE
Original Filed Aug. 23, 1963 6 Sheets-Sheet 6

INVENTOR.
FLOYD C. SCOTT
BY
Van Valkenburgh and Fields
ATTORNEYS

United States Patent Office 3,360,067
Patented Dec. 26, 1967

3,360,067
FOUR WHEEL DRIVE ARTICULATED VEHICLE
Floyd C. Scott, Wheatridge, Colo., assignor to Hustler Corporation, Adams City, Colo., a corporation of Colorado
Continuation of application Ser. No. 304,001, Aug. 23, 1963. This application Jan. 18, 1967, Ser. No. 610,201
10 Claims. (Cl. 180—51)

ABSTRACT OF THE DISCLOSURE

A vehicle having front and rear chassis portions articulated together for pivotal movement about both vertical and longitudinally horizontal axes. Each chassis portion includes an axle mounting a pair of wheels, a prime mover is mounted on one of said portions and is drivingly connected directly to the axle of said portion, and also to the axle of the other portion through a drive shaft having a universal joint at each end and respectively connected to said axles.

The application is a continuation of application Serial No. 304,001 filed Aug. 23, 1963, and since abandoned.

This invention relates to a vehicle, and more particularly to a vehicle for use in off-road travel and over rough terrain.

Various attempts have been made to construct a vehicle for use in off-road operation over rough terrain. However, each of these vehicles has had certain inherent disadvantages. Automobiles of various types have been provided with four-wheel drives to increase traction, but such a vehicle is not usable where the terrain is very uneven or the space through which the vehicle must pass is very narrow. Also, attempts have been made to manufacture one-wheel vehicles which operate on the principle of gyroscopic action, but these have inherent disadvantages in that the weight within the vehicle must be evenly distributed and usually the vehicle is not of sufficient size to carry more than one or two passengers and little additional equipment or cargo. Also, a previous vehicle has been constructed wherein the front portion of the vehicle and the rear portion of the vehicle are connected together for lateral rotation or movement with respect to each other, so that the front wheels may be tilted laterally without tilting the back wheels and vice versa. However, in this vehicle, the drive shaft housing is used for the connection between the two sections of the vehicle, which has the disadvantage of being vulnerable to being struck and damaged by stones or other objects protruding from the ground and extending upwardly between the wheels, with consequent damage to the drive shaft. In the type of terrain in which the present vehicle is particularly usable, such obstacles are often encountered, thus making this a real and serious problem.

Among the objects of the present invention are to provide a novel vehicle for use over rough terrain; to provide such a vehicle which has a four-wheel drive; to provide such a vehicle having a chassis with the front and rear sections interconnected for both lateral movement and rotation with respect to each other; to provide such a vehicle wherein either the front or rear wheels may be tipped independently of the other set of wheels, permitting travel over obstacles which would tip an ordinary vehicle over on its side; to provide such a vehicle utilizing an engine either in the front portion of the vehicle or in the rear portion thereof; to provide such a vehicle wherein the drive shaft is flexibly connected to a differential at both ends; to provide such a vehicle wherein the chassis is constructed separately from the drive shaft; to provide such a vehicle wherein the chassis protects the drive shaft from damage by objects protruding above the ground in the path of the vehicle; to provide such a vehicle which is of relatively simple construction; and to provide such a vehicle which is useful and is economical to operate.

Additional objects and the novel features will become apparent from the description which follows, taken in conjunction with the accompanying drawings, in which.

Figure 1:
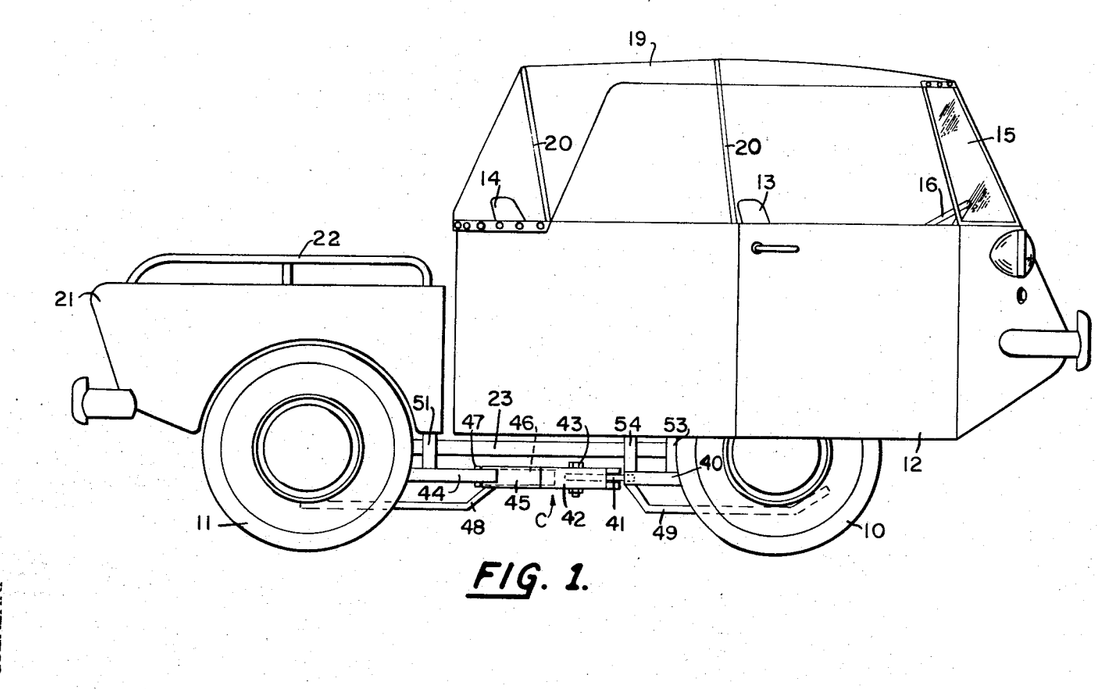
FIG. 1 is a side elevation of a vehicle constructed in accordance with this invention, having a rear engine drive and forming one embodiment thereof.
Figure 2:
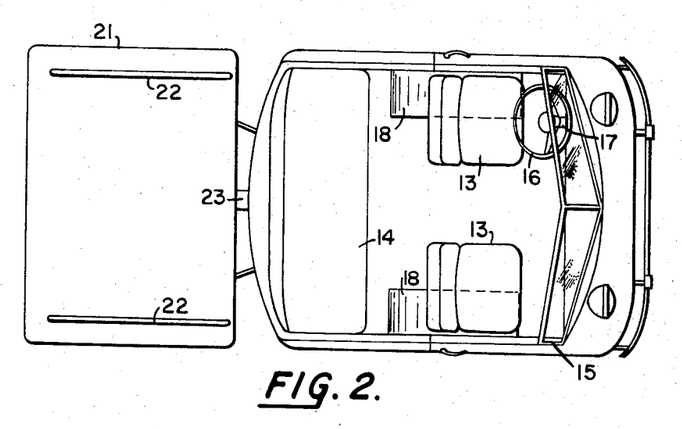
FIG. 2 is a top plan view, on a reduced scale, of the vehicle of FIG. 1.

In accordance with this invention, a vehicle adapted to travel over rough terrain is provided, in the embodiment of FIG. 1, with a chassis C supported by a pair of front wheels 10 and a pair of rear wheels 11. Conveniently, a cab 12 is mounted on the front portion of the chassis and provided with spaced front seats 13, a rear seat 14, a windshield 15 and a steering wheel 16 mounted on a steering column 17, as in FIG. 2, and connected to the chassis in a manner to be described below. As in FIG. 2, front seats 13 may be mounted over front wheel wells 18, while the rear seat 14 conveniently is removable so that the rear portion the cab may be used to carry cargo, camping equipment or other articles. The cab may also be provided with a removable, transparent top 19, which may be made of plastic and supported by spaced struts 20, as well as by windshield 15. Of course, any conventional type of top may be provided.

A motor and transmission housing 21 is mounted on the rear portion of chassis C and houses an air cooled motor, along with other associated parts to be described later, and, if necessary, the housing may be provided with suitable vents (not shown) to provide adequate cooling of the motor. Conveniently, a pair of spaced, parallel baggage rails 22 extend across the top of motor housing 21 for the purpose of strapping or attaching baggage thereto during transportation.

Figure 4:
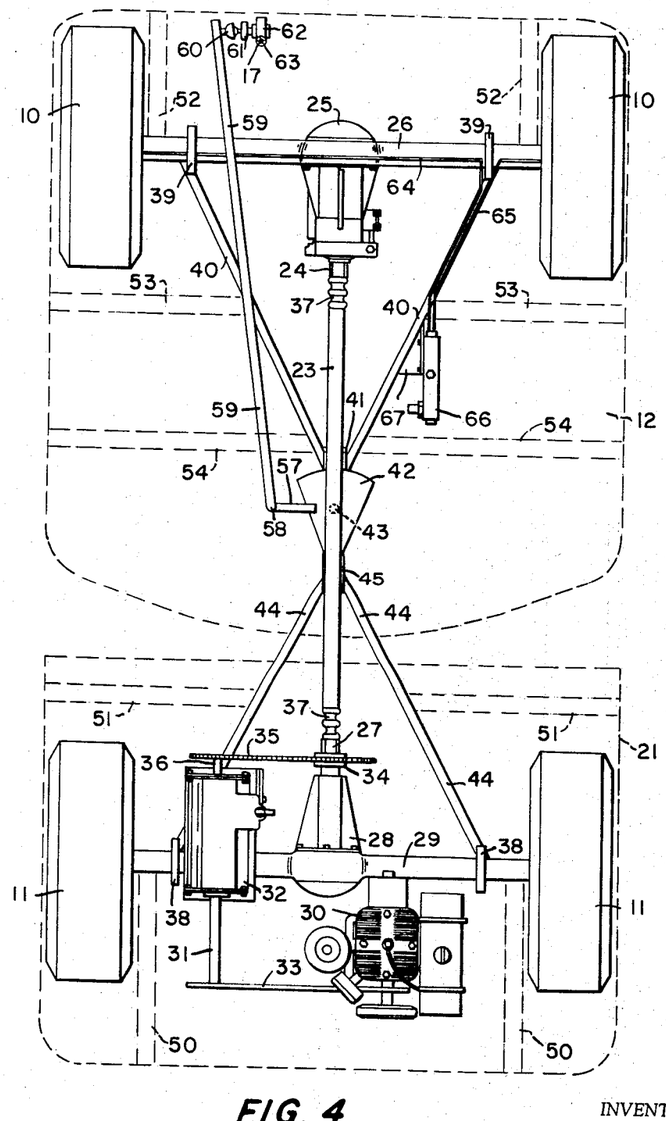
FIG. 4 is a top plan view of the chassis of the vehicle of FIG. 1, with the cab and engine housing shown in dotted lines.
Figure 5:
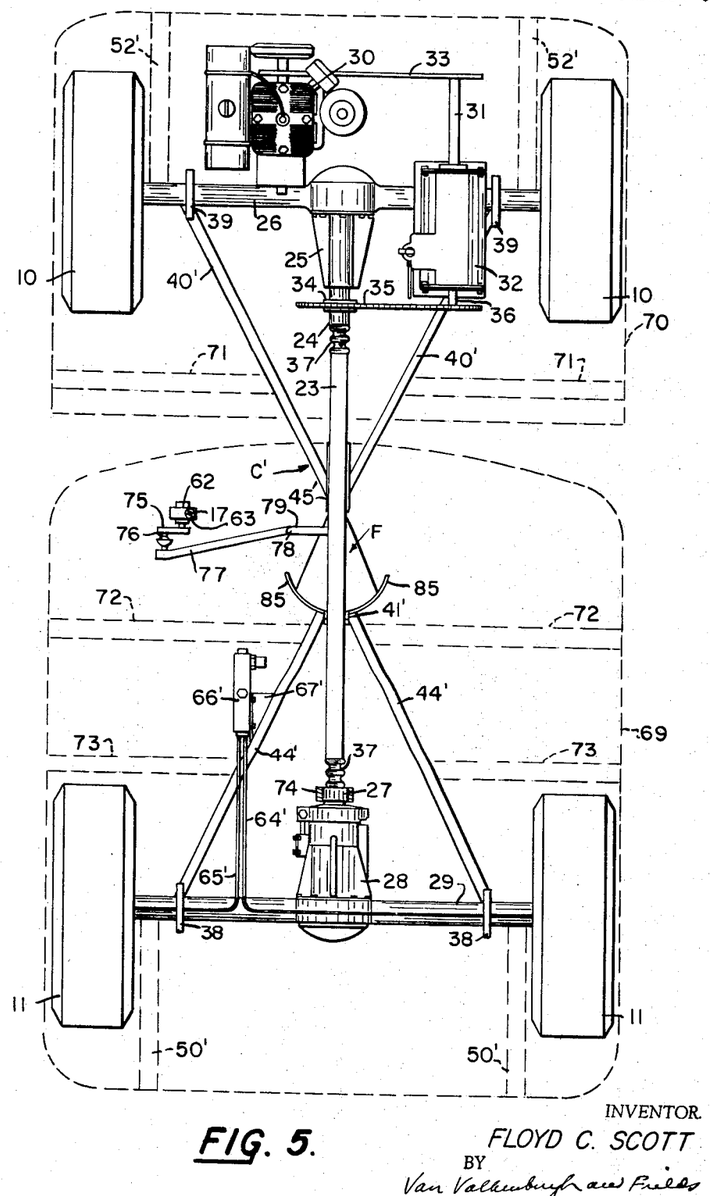
FIG. 5 is a top plan view of a chassis, similar to FIG. 4, but with the engine mounted in the front portion of the vehicle and forming a second embodiment of this invention.
Figure 6:
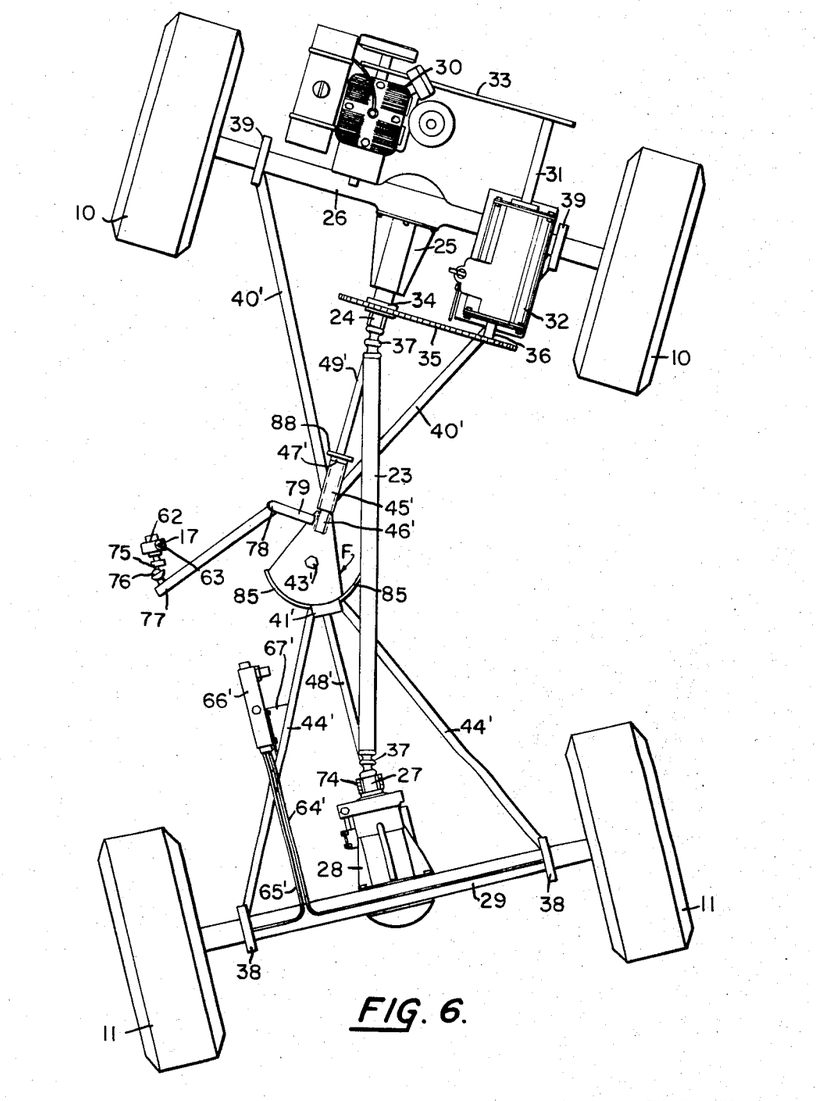
FIG. 6 is a top plan view of the chassis of FIG. 5, but showing the position thereof when the vehicle is making a right hand turn.

A drive shaft 23, positioned above the connecting parts of chassis C, as in FIG. 1, interconnects differential shaft 24 of FIG. 4 for driving the gearing in a differential housing 25 of a front axle housing 26 with a differential shaft 27 for driving the gearing in a differential housing 28 of a rear axle housing 29, to drive the front and rear axles simultaneously. With this arrangement, the drive shaft is protected by chassis C from damage by rocks or other obstructions, which might protrude from the ground between the wheels of the vehicle. An air cooled motor 30 is mounted within motor housing 21 and is connected to an input shaft 31 of a transmission 32 by means of a belt 33 and appropriate pulleys. In turn, transmission 32 is connected to a sprocket 34 on rear differential shaft 24 by means of a chain 35, which also engages a sprocket mounted on the end of output shaft 36 of transmission 32. At each end, drive shaft 23 is provided with a flexible coupling or universal joint 37, to permit the drive shaft to be moved angularly with respect to either the front axle housing 26 or the rear axle housing 29.

The motor housing 21 may be supported by a pair of spaced, upstanding brackets 38 mounted on rear axle housing 29, as shown, while cab 12 may be supported by a pair of spaced, upstanding brackets 39, which are mounted on front axle housing 26. Chassis C may also include a pair of diagonal struts 40 extending inwardly and rearwardly from front axle housing 26, as below the respective brackets 39, to a tongue 41, as in FIG. 1, which is received in and pivotally connected to a bearing or fan plate 42 by means of a vertical pivot pin or bolt 43. A similar pair of diagonal struts 44, as in FIG. 4, extend inwardly and forwardly from rear axle housing 29, as below brackets 38, and are connected, as by welding, to a sleeve 45 which is rotatable on a horizontal pivot shaft 46, as in FIG. 1, fixedly attached to fan plate 42, as by welding. Shaft 46 is provided with a cap or head 47 rearwardly of sleeve 45 to restrict longitudinal movement thereof. Tongue 41, fan plate 42 and shaft 46 may be constructed similarly to corresponding parts of the vehicle of FIGS. 5–10, as described later. The rear portion of chassis C may be further reinforced by an angular brace 48, as in FIG. 1, extending forwardly from the underside of rear differential housing 28, then upwardly to sleeve 45, being attached to each, as by welding. The front portion of chassis C may be further reinforced by a similar angular brace 49, extending rearwardly from the underside of front differential housing 25, then upwardly to tongue 41, again being attached to each, as by welding.

Motor housing 21 may be further supported and attached to chassis C, as in FIG. 4, by a pair of spaced braces 50, extending upwardly and rearwardly from rear axle housing 29 to the underside of the motor housing at the rear thereof, and a pair of lateral braces 51 extending upwardly to the underside of motor housing 21, adjacent the front thereof, from the respective struts 44. Likewise, cab 12 may be further supported and attached to chassis C by spaced front braces 52 extending upwardly from front axle housing 26 to the underside of cab 12, at the front thereof, and two pairs of lateral braces 53 and 54, each extending outwardly and upwardly from a strut 40 to the underside of cab 12, respectively adjacent the center and toward the rear thereof, at each side. Braces 50 through 54 are conveniently attached at each end by welding.

Figure 3:
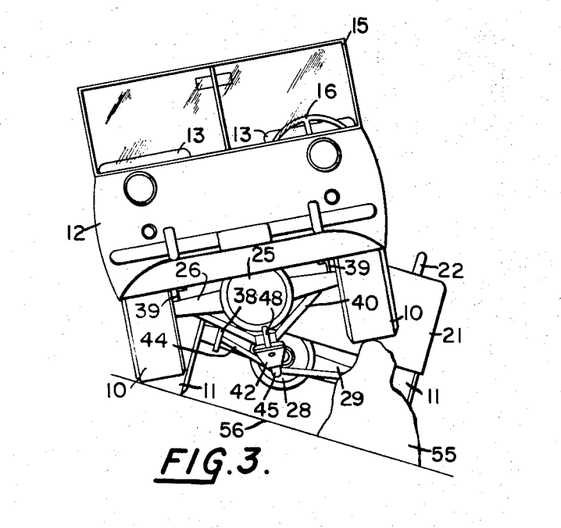
FIG. 3 is a front elevation of the vehicle of FIG. 1, on a reduced scale, showing a front wheel of the vehicle going over an obstacle on a slope.

As will be evident, pivot pin or bolt 43 permits either the front or rear half of the chassis to pivot about a vertical axis relative to the other, which permits the vehicle to be steered, as described below. As will also be evident, stub shaft 46 and sleeve 45 permit either the front or rear half of the chassis to pivot about a horizontal axis relative to the other half. Thus, when one of the front wheels 10 encounters an obstruction, such as rock 55 of FIG. 3, the front half of the chassis, including shaft 46, will rotate about sleeve 45, permitting the cab to tilt laterally with respect to the motor housing 21 and the rear half of chassis C. Similarly, when the rear wheel 11 encounters the obstruction, the rear half of the chassis C will tip upwardly at that side, since sleeve 45 will rotate about shaft 46. Of course, if the obstruction is long enough, both front and rear wheels on the same side may be on the obstruction simultaneously. However, when the front wheel rides up onto the obstruction, the front half of the chassis, with the cab, will tip, as in FIG. 3, while as the front wheel leaves the obstruction, the rear half of the chassis, with the motor, will be tipped upwardly on that side. It will be noted that the vehicle is shown in FIG. 3 as traveling along a side hill 56, but the lateral tipping of one half of the chassis with respect to the other half will permit the vehicle to surmount obstructions of considerable size, irrespective of whether traveling on the level, uphill, downhill or along the side of a hill. With this arrangement, it can also be seen that it is very difficult to tip the vehicle over, since this can occur only if the center of gravity of one half of the vehicle moves outwardly beyond one of its wheels. However, means may be provided, as described in connection with the second embodiment, to restrict the lateral pivotal movement of either half of the chassis, in order to minimize the possibility of tipping either half of the chassis over, without materially restricting the ability of the vehicle to surmount obstructions at either side.

The vehicle may be steered through a linkage system, as in FIG. 4, which includes an arm 57 rigidly attached to fan plate 42, as by welding, and preferably aligned with pivot bolt 43. Arm 57 is connected at its outer end by a ball joint 58 to a longitudinally adjustable steering rod 59 extending to the underside of the forward end of cab 12. The front end of steering rod 59 is connected by a ball joint 60 to a steering knuckle 61, which moves forwardly and rearwardly in a vertical plane and is, in turn, connected through a conventional reduction worm and gear mounted in a housing 62, with a conventional shaft 63 extending through steering column 17, the latter also shown in FIG. 2. The arrangement of the reduction gearing is such that, by turning steering wheel 16 in a clockwise direction, the steering knuckle 61 will move steering rod 59 forwardly. In turn, arm 57 will be forced to pivot in a clockwise direction, moving fan plate 42 with it. The resultant reaction at bolt 43 of FIG. 1 will cause the fan plate 42 to be shifted to the left, as viewed in FIG. 4, so that the center lines of the two halves of the chassis will be forced to assume an obtuse angle, with the vertex to the left. Thus, the vehicle will be turned to the right. Similarly, when steering wheel 16 is turned in a counterclockwise direction, steering rod 59 will be moved rearwardly, causing the vehicle to turn to the left.

Conventional brakes are provided on front wheels 10, and are supplied with hydraulic fluid by brake lines 64 and 65 from a master cylinder 66 mounted on a bracket 67 attached to a strut 40. The brakes are caused to operate by applying pressure to a brake pedal (not shown) in cab 12, operatively connected to the brake lines in the usual manner. Due to the normally slower speeds at which the vehicle is driven, braking is not as important a factor as with higher speed vehicles. However, the braking effect on the front wheels is transmitted to all four wheels, since the wheels are interconnected through drive shaft 23.

An alternative embodiment, shown in FIGS. 5–11, operates in basically the same manner as the embodiment of FIGS. 1–4, except that the motor 30 is mounted on the front half of a chassis C' and the passengers ride in a cab 69 mounted on the rear half of the chassis. As before, the front and rear halves of chassis C' are pivotal relative to each other about both a vertical and a horizontal axis, as in FIGS. 6 and 7. Although, as in FIGS. 5 and 6, the fan plate F, sleeve 45' and pivot shaft 46' are reversed in position from the corresponding parts of the first embodiment, the parts are essentially the same in construction. Thus, front struts 40' extend from front axle housing 26 for attachment to sleeve 45' and rear struts 44' extend from rear axle housing 29 for attachment to tongue 41'. As before, tongue 41' is pivoted in fan plate F by a bolt 43' and drive shaft 23 is connected by universal joints 37 to front differential shaft 24 and rear differential shaft 27. Motor housing 70 is supported by a pair of brackets 39 mounted on front axle housing 26, and further supported by front braces 52' extending forwardly and upwardly from the front axle housing and side braces 71 extending laterally and upwardly from struts 40', each to the underside of the motor housing. Cab 69 is supported by a pair of brackets 38 mounted on rear axle housing 29, while rear braces 50' extend rearwardly and upwardly from the rear axle housing, and spaced pairs of side braces 72 and 73 extend laterally and upwardly at each side from struts 44', each to the underside of cab 69. A central angular brace 48' extends from the underside of rear differential housing 28 to the underside of tongue 41', while a similar brace 49' extends from the underside of front differential housing 25 to the underside of sleeve 45'. Motor 30 is mounted within motor housing 70 on a suitable motor mount (not shown) and is connected, as before, by an endless belt 33 with input shaft 31 of transmission 32, the output shaft 36 of which is connected by a chain 35 with a sprocket 34 mounted on front differential shaft 24. Master brake cylinder 66' is mounted on a bracket 67' attached to a strut 44' and supplies hydraulic fluid through lines 64' and 65' to brakes installed on rear wheels 11, with the braking effect transmitted to the front wheels 10 through drive shaft 23. A brake pedal (not shown) is mounted in cab 69 and connected to master cylinder 66' in a conventional manner. In addition, a brake band 74 may encircle differential shaft 27 and installed in a conventional manner to be tightened or released by a hand brake handle mounted in cab 69.

For steering purposes, a steering wheel and steering column having a shaft 63 therein, as in the first embodiment, are installed in cab 69 and connected through reduction gearing in housing 62 with a knuckle joint 75 which moves from side to side in a vertical plane. Knuckle joint 75 is pivotally connected by a ball joint 76 to a steering rod 77, in turn pivotally connected by a ball joint 78 to a steering arm 79 rigidly attached to fan plate F and extending outwardly from the left side, at the narrow end thereof, so that leverage will be exerted between the inner end of arm 79 and pivot bolt 43'. As before, upon turning the steering wheel in a clockwise direction, the steering arm 79 will be moved forwardly, as in FIG. 6, causing fan plate F to move to the left, so as to cause the vehicle to turn to the right, as shown. Similarly, upon turning the steering wheel in a counterclockwise direction, steering arm 79 will be moved rearwardly, so that the vehicle will be caused to make a left hand turn.

Figure 7:
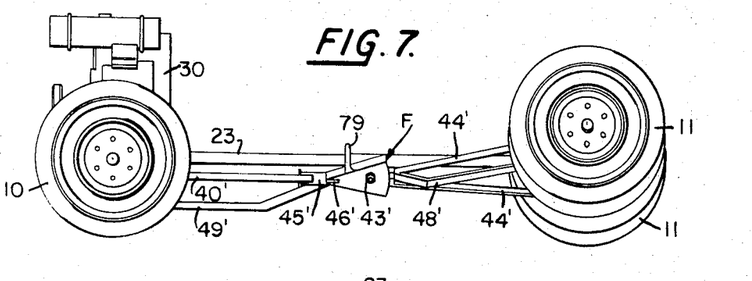
FIG. 7 is a side elevation, on a reduced scale, of the chassis of the vehicle of FIGS. 5 and 6, with the rear portion of the chassis tipped laterally.
Figure 8:
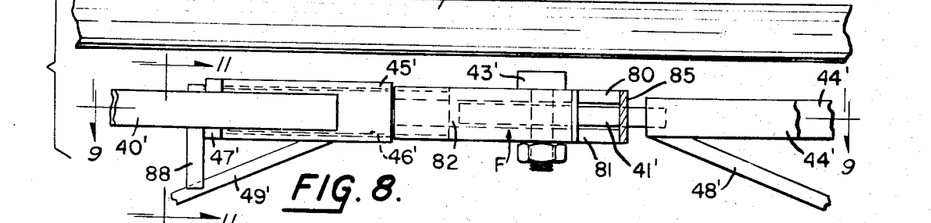
FIG. 8 is a fragmentary side elevation, on an enlarged scale, of the drive shaft and connection between the front and rear portions of the vehicle of FIG. 7.

The preferred construction of the fan plate F and associated parts is shown in FIGS. 7–11. It will be understood that the preferred construction of fan plate 42 and associated parts of the first embodiment is similar thereto. The fan plate F thus includes an upper plate 80 and a lower plate 81, each of which is of similar fan-shaped configuration, as shown, arcuate at the wider end and joined along their side edges by side plates 82 and 83. Tongue 41' extends into the wide end of fan plate F and pivots on vertical pivot pin or bolt 43'. A narrow stop block 84, as in FIG. 9, may be welded on the inside of each side plate 82 and 83, which will be engaged by tongue 41' when it swing to either side, not only to facilitate return movement but also to provide a lubricant sealing area for arcuate cover plates 85 which are attached to tongue 41' at each side and which cover the open end of fan plate F to prevent stones, debris or the like from lodging in the fan plate F, as well as limiting the leakage of grease therefrom. The angle between the sides of plates 80 and 81 is such that the desired turns can be produced. As shown, this angle is approximately 45°, so that the front half of the chassis can be turned 22½° to either the left or right, with respect to the rear half. However, the vehicle is preferably relatively short coupled, such as having a center to center distance between the front and rear wheels of 60 inches and a center to center distance between the front or rear tire treads of 44 inches. With a center to center distance between the front and rear wheels of 60 inches, the turning radius, at 22½°, is approximately 12 ft. 10 in., which compares favorably with the overall length of the vehicle, such as 8 ft. to 10 ft. It will be noted that the tongue 41', as in FIG. 8, is relatively wide, and extends into the fan plate F for a considerable distance, both forwardly and rearwardly of the pivot bolt 43'. This provides a relatively large bearing area between the tongue and both the upper and lower plates 80 and 81, which adds to the stability of the connection between the two halves of the chassis and to the resistance of the pivot connection to bending movements in a vertical direction. Conveniently, stub shaft 46' extends into slots 86 and 87 in the top plate 80 and bottom plate 81, respectively, and is attached thereto by welding, as in FIG. 10, so that shaft 46' is securely attached to fan plate F. Head 47', at the opposite end of shaft 46', together with abutment of sleeve 45' against the adjacent end of fan plate F, restrict longitudinal movement of shaft 46' in sleeve 45'. Head 47' of shaft 46' may be formed integrally therewith, in which case sleeve 45' should be slipped over shaft 46' before the latter is welded to fan plate F. However, head 47' may be a collar welded on the end of shaft 46' and such welding may be performed after sleeve 45' is slipped thereover, when the weld is at the end of shaft 46'.

Figures 9, 10, 11:
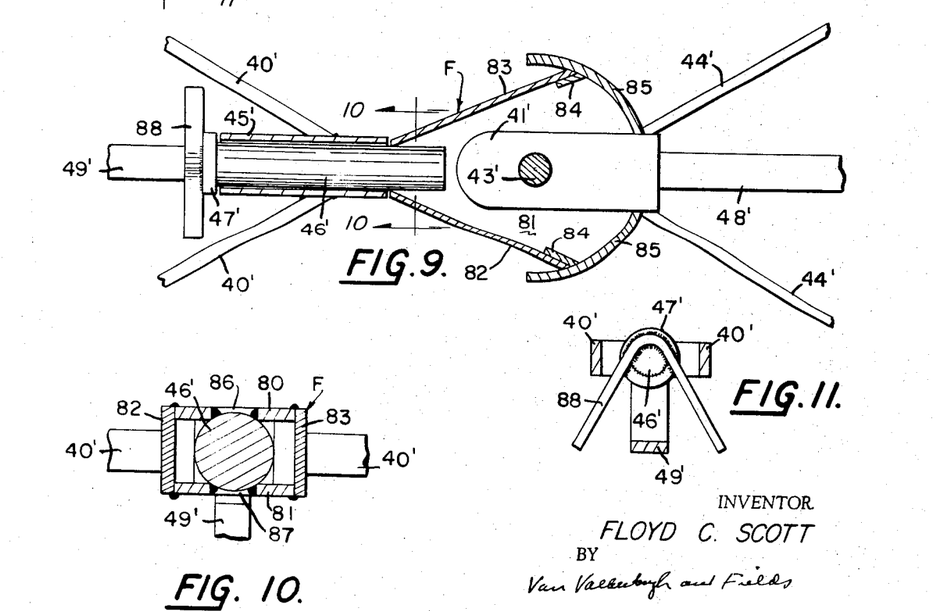
FIG. 9 is a longitudinal section, taken along line 9—9 of FIG. 8, showing further details of the chassis connection.
FIG. 10 is an enlarged, vertical section, taken along line 10—10 of FIG. 9.
FIG. 11 is an enlarged vertical section, taken along line 11—11 of FIG. 8.

A stop 88 which, as in FIGS. 8 and 11, is conveniently a rod bent to a V-shape and welded to the end of shaft 46', may be provided to limit the lateral pivoting of either half of the chassis, through one leg of stop 88 engaging center brace 49', as will be evident from FIG. 11. The angularity between the legs of stop 88 may be proportioned so that either front wheel may move freely upwardly a distance, such as 15 inches, above the other front wheel, but when either leg of stop 88 engages center brace 49', further upward movement of the uplifted front wheel will cause the rear half of the chassis to tip upwardly in the same direction. While the rear wheel, on the same side as the uplifted front wheel, will then be raised off the ground, it will soon encounter the same obstruction which caused the front wheel to be uplifted and thus again be in driving engagement. As will be evident, such a stop will minimize the possibility of tipping either half of the vehicle over, since the stop will act in the same manner if a rear wheel is lifted more than the distance, such as 15 inches, above the opposite rear wheel. As indicated previously, the first embodiment of FIGS. 1–4 may be equipped with a similar stop.

As will be evident from FIG. 7, the front half of the chassis C' may rotate laterally with sleeve 45' about shaft 46', independently of the rear half of the chassis; similarly, the rear half of chassis C' may rotate with shaft 46', which rotates within sleeve 45', independently of the front half of the chassis. Also, one half of the chassis may rotate laterally in one direction and the other half laterally in the opposite direction, which will happen when a front wheel encounters an obstacle at one side and a rear wheel encounters an obstacle on the opposite side. The two halves of the vehicle may, of course, be pivoted about a vertical axis at the same time that obstructions on one or both sides are encountered. As in FIG. 8, the drive shaft 23 is above the chassis, so that the drive shaft is protected from damage by obstructions which may be encountered in the terrain over which the vehicle is driven. As will be evident, the center braces 48 and 49 of the first embodiment, as in FIG. 1, and the center braces 48' and 49' of the second embodiment, as in FIG. 7, protect the fan plate and associated parts from obstructions in the center of the path of the vehicle, since these braces extend horizontally for a considerable distance before extending upwardly to the tongue 41 or 41' and sleeve 45 or 45', respectively. The center braces also protect the front and rear differential housings 25 and 28, respectively, from damage by a direct blow by an obstruction, such as a rock, since they are welded to the underside of the differential housings and will receive the impact. If desired, braces 49 and 49' may be curved upwardly at the front, as in FIG. 1, to provide additional protection for the front differential housing, thereby acting as a skid to move over an obstruction in the center of the path of the vehicle. Of course, the driver can normally steer the vehicle so that the wheels will pass over obstructions, rather than the center of the vehicle.

From the foregoing, it will be evident that a vehicle constructed in accordance with this invention fulfills to a marked degree the requirements and objects hereinbefore set forth. A vehicle has been provided which can be used over rough terrain and has a four-wheel drive. Either a front engine or rear engine drive may be provided and the front portion of the chassis, including the front wheels, may tip laterally, independently of the rear wheels, and vice versa, permitting travel over obstacles which would cause an ordinary vehicle to tip over. Furthermore, the drive shaft is flexibly connected to a differential at both ends, to permit turning the vehicle to go around corners. The chassis is articulated by providing on one half a fan plate having a shaft which is rotatable about a horizontal axis within a sleeve on the other half of the chassis. Also, the fan plate provides stability to the vehicle through an adequate bearing area for a tongue connected thereto by a vertical pivot pin to permit turning of the vehicle. Furthermore, with the drive shaft positioned above the chassis, it is protected against damage by rocks and other obstructions encountered by the vehicle, while the angular center braces provide further protection against obstructions which might cause damage to the fan plate and associated parts or the differentials. It can also be seen that the construction of the vehicle is relatively simple, yet highly efficient in operation.

Although two embodiments of this invention have been illustrated and described, it will be understood that other embodiments may exist, that various changes and variations may be made and that the features of one embodiment may be incorporated in the other embodiment without departing from the spirit and scope of this invention.

What is claimed is:

1. A vehicle adapted for travel over rough terrain comprising:
    a front chassis portion including a pair of front wheels interconnected by a front axle;
    a rear chassis portion including a pair of rear wheels interconnected by a rear axle;
    pivot means interconnecting said front and rear chassis portions for pivotal movement about a vertical axis for steering said vehicle and for pivotal movement about a horizontal axis to permit lateral tipping of one chassis portion with respect to the other chassis portion;
    an engine mounted on one of said chassis portions and connected to drive said axle of said one chassis portion;
    a drive shaft spaced above said pivot means and connected to drive said axle of the other of said chassis portions; and
    a universal joint at each end of said drive shaft and disposed respectively adjacent the drive connection between said engine and said axle of said one said chassis portion and the axle of the other said chassis portion.

2. In a vehicle having front and rear chassis portions provided with wheels, means for driving said wheels and pivot means interconnecting said front and rear chassis portions for pivotal movement about a vertical axis for steering said vehicle and for pivotal movement about a horizontal axis to permit lateral tipping of one chassis portion with respect to the other chassis portion, the improvement wherein said pivot means includes:
    a bearing plate including spaced upper and lower fan plates, each being wider at one end than at the other end and side plates connecting the sides of said upper and lower plates;
    a tongue connected to one of said chassis portions and extending between said upper and lower plates from the wider end thereof;
    a vertical pivot pin extending through said upper and lower plates and interconnecting said tongue and said plates for pivotal movement about said vertical axis;
    a stub shaft connected to and extending from the opposite end of said bearing plates from said tongue, each of said upper and lower plates having a longitudinal slot in which said shaft is welded to said plates; and
    a tubular sleeve connected to the other of said chassis portions and engaging said stub shaft for rotational movement, said stub shaft having a head at the outer end thereof to restrict longitudinal movement of said sleeve with respect to said shaft in one direction and the ends of said side plates and upper and lower plates restricting longitudinal movement in the opposite direction between said sleeve and said stub shaft, relative rotation between said sleeve and said stub shaft permitting relative lateral rotation of one of said chassis portions with respect to the other of said chassis portions.

3. A vehicle adapted for travel over rough terrain, comprising:
    a front chassis portion including a pair of front wheels interconnected by a front axle;
    a rear chassis portion including a pair of rear wheels interconnected by a rear axle;
    means for driving said wheels;
    spaced upper and lower bearing plates connected with one of said chassis portions, said bearing plates having diverging sides and arcuate edges at the wider ends;
    side plates closing the sides of the space between said upper and lower plates;
    a tongue attached to the other of said chassis portions and extending between said bearing plates;
    an arcuate plate attached to each side of said tongue for covering the open end of said bearing plates; and
    a normally vertical pivot pin interconnecting said plates and said tongue for pivotal movement of said chassis portions with respect to each other.

4. A vehicle, as set forth in claim 3, including:
    a shaft attached to said bearing plates and extending longitudinally therefrom; and
    a sleeve surrounding said shaft and pivotally connecting said bearing plates with said one chassis portion.

5. A vehicle adapted to travel over rough terrain comprising:
    a front chassis portion including a pair of front wheels interconnected by a front axle;
    a rear chassis portion including a pair of rear wheels interconnected by a rear axle;
    a bearing plate operatively connected with one of said chassis portions;
    a stub shaft attached to one end of said bearing plate and extending therefrom;
    a sleeve mounted on said stub shaft and adapted for rotational movement thereabout, said sleeve and said stub shaft permitting lateral tipping of either portion of said chassis with respect to the other portion of said chassis;
    a tongue attached to the other said chassis portion and pivotally connected to said bearing plate for movement about a normally vertical axis for steering said vehicle;
    a motor drive means mounted on one of said chassis portions;
    a drive shaft connected to drive said axles from said motor drive means;
    a housing for said axle of one said chassis portion;
    a differential for said axle and a housing for said differential disposed centrally of said axle housing;

a pair of struts connected between said tongue and said axle housing adjacent said wheels; and an angular brace connected between said tongue and said differential housing, said angular brace extending generally horizontally from the underside of said differential housing and then upwardly to said tongue.

6. A vehicle adapted to travel over rough terrain comprising:

a front chassis portion including a pair of front wheels interconnected by a front axle;

a rear chassis portion including a pair of rear wheels interconnected by a rear axle;

a bearing plate operatively connected with one of said chassis portions;

a stub shaft attached to one end of said bearing plate and extending therefrom;

a sleeve mounted on said stub shaft and adapted for rotational movement thereabout, said sleeve and said stub shaft permitting lateral tipping of either portion of said chassis with respect to the other portion of said chassis;

a tongue attached to the other said chassis portion and pivotally connected to said bearing plate for movement about a normaly vertical axis for steering said vehicle;

motor drive means mounted on one of said chassis portions;

a drive shaft connected to drive said axles from said motor drive means;

a housing for said axle of one said chassis portion;

a differential for said axle and a housing for said differential disposed centrally of said axle housing;

a pair of struts connected between said sleeve and said axle housing adjacent said wheels; and an angular brace connected between said sleeve and said differential housing, said angular brace extending generally horizontally from the underside of said differential housing and then upwardly to said sleeve.

7. A vehicle adapted to travel over rough terrain, comprising, a front chassis and a rear chassis, each chassis comprising a rigid axle housing and a pair of frame members fixed adjacent the outer ends of a respective axle housing and projecting generally horizontally toward the other chassis and in convergent relation to each other defining an apex whereat each pair of frame members are joined, means joining the apices of said frame members for articulation about a horizontal longitudinal axis and a vertical axis, body means rigidly mounted on each chassis, each body means being spaced above its corresponding chassis to define a clearance region between each body means and chassis, each axle housing including a centrally located differential housing portion having a drive pinion shaft projecting horizontally therefrom toward the other chassis and above the level of said frame members, prime mover means driving one of said drive pinion shafts, and a drive coupling shaft extending between said drive pinion shafts and a pair of universal joints joining the opposite ends of said drive coupling shaft to the respective drive pinion shafts and constituting the sole support for said drive coupling shaft, whereby said drive coupling shaft is disposed within said clearance region and is free to swing laterally therewithin and to accommodate for twist between said chassis in response to movement about said vertical and horizontal axes respectively without engaging or encountering said frame members of the chassis.

8. The vehicle according to claim 7 including steering mechanism mounted on one of said chassis portions and having an actuating link connected to the other chassis portion adjacent the apex thereof.

9. The vehicle according to claim 7 wherein said means joining the apices of said frame members includes a horizontal sleeve carried by one of said frame members and a stub shaft rotatably received in said sleeve and connected to the other frame member to establish said articulation about a horizontal longitudinal axis.

10. The vehicle according to claim 9 wherein said means joining the apices of said frame members also includes a vertical pin carried by one frame member and journalled in the remaining frame member for establishing said articulation about a vertical axis.

No references cited.

A. HARRY LEVY, *Primary Examiner.*